United States Patent
Kleinau et al.

(10) Patent No.: US 11,904,898 B2
(45) Date of Patent: Feb. 20, 2024

(54) METHOD, COMPUTER PROGRAM AND APPARATUS FOR CONTROLLING OPERATION OF A VEHICLE EQUIPPED WITH AN AUTOMATED DRIVING FUNCTION

(71) Applicant: VOLKSWAGEN AKTIENGESELLSCHAFT, Wolfsburg (DE)

(72) Inventors: Sandra Kleinau, Rötgesbüttel (DE); Bernd Rech, Bokensdorf (DE); Thorsten Bagdonat, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 106 days.

(21) Appl. No.: 17/474,881

(22) Filed: Sep. 14, 2021

(65) Prior Publication Data
US 2022/0081011 A1 Mar. 17, 2022

(30) Foreign Application Priority Data
Sep. 15, 2020 (EP) .................................... 20196200

(51) Int. Cl.
*B60W 60/00* (2020.01)
*H04W 4/44* (2018.01)
(Continued)

(52) U.S. Cl.
CPC .. *B60W 60/00184* (2020.02); *B60W 60/0015* (2020.02); *B60W 60/00274* (2020.02);
(Continued)

(58) Field of Classification Search
CPC ....... B60W 60/00184; B60W 60/0015; B60W 60/00274; B60W 2050/0095; G06V 20/584; G08G 1/096725; H04W 4/44
See application file for complete search history.

(56) References Cited

U.S. PATENT DOCUMENTS

| 8,761,991 B1 * | 6/2014 | Ferguson | G08G 1/096758 |
| | | | 701/28 |
| 2013/0253754 A1 * | 9/2013 | Ferguson | G06V 20/584 |
| | | | 701/28 |

(Continued)

FOREIGN PATENT DOCUMENTS

| CN | 106327897 A * | 1/2017 | ....... G08G 1/096783 |
| CN | 106327897 A | 1/2017 | |

(Continued)

OTHER PUBLICATIONS

Translation of CN-111292531-A, 16 pages (Year: 2020).*
(Continued)

*Primary Examiner* — Dale W Hilgendorf
(74) *Attorney, Agent, or Firm* — Barnes & Thornburg LLP (57) ABSTRACT

A method, a computer program, and an apparatus for controlling operation of a transportation vehicle equipped with an automated driving function and a transportation vehicle equipped with an automated driving function which uses the method or apparatus. A first signal state of a traffic light is determined from data of at least one vehicle sensor, the determined first signal state of the traffic light is then validated based on information available in the transportation vehicle, and an operation mode of the transportation vehicle is set as a function of a validation result.

20 Claims, 5 Drawing Sheets

(51) Int. Cl.
*G06V 20/58* (2022.01)
*G08G 1/0967* (2006.01)
*B60W 50/00* (2006.01)

(52) U.S. Cl.
CPC ..... *G06V 20/584* (2022.01); *G08G 1/096725* (2013.01); *H04W 4/44* (2018.02); *B60W 2050/0095* (2013.01)

(56) References Cited

U.S. PATENT DOCUMENTS

| | | | |
|---|---|---|---|
| 2018/0257615 A1* | 9/2018 | Rawashdeh | G06V 20/584 |
| 2019/0018408 A1 | 1/2019 | Gulati et al. | |
| 2019/0092291 A1* | 3/2019 | Pink | G06F 16/909 |
| 2019/0332875 A1* | 10/2019 | Vallespi-Gonzalez | G06V 20/584 |
| 2020/0004268 A1* | 1/2020 | Park | G06V 20/584 |
| 2020/0393261 A1* | 12/2020 | Zhang | G08G 1/0133 |
| 2021/0158700 A1* | 5/2021 | Mao | G06V 20/584 |
| 2021/0261152 A1* | 8/2021 | Meijburg | G01C 21/28 |
| 2021/0397827 A1* | 12/2021 | Silver | G06V 20/584 |
| 2022/0076037 A1* | 3/2022 | Hochman | B60W 30/146 |
| 2023/0175863 A1* | 6/2023 | Kitahara | B60W 40/02 701/400 |

FOREIGN PATENT DOCUMENTS

| | | | | |
|---|---|---|---|---|
| CN | 111292531 A | * | 6/2020 | G06K 9/00825 |
| CN | 112818853 A | * | 5/2021 | G06K 9/00791 |

OTHER PUBLICATIONS

Translation of CN-112818853-A, 9 pages (Year: 2021).*
Search Report for European Patent Application No. 20196200.8; dated Jun. 15, 2021.
Office Action; European Patent Application No. 20196200.8; dated Oct. 12, 2023.

* cited by examiner

METHOD, COMPUTER PROGRAM AND APPARATUS FOR CONTROLLING OPERATION OF A VEHICLE EQUIPPED WITH AN AUTOMATED DRIVING FUNCTION

PRIORITY CLAIM

This patent application claims priority to European Patent Application No. 20196200.8, filed 15 Sep. 2020, the disclosure of which is incorporated herein by reference in its entirety.

SUMMARY

Illustrative embodiments relate to a method, a computer program, and an apparatus for controlling operation of a transportation vehicle equipped with an automated driving function. Illustrative embodiments further relate to a transportation vehicle equipped with an automated driving function, which makes use of such a method or apparatus.

BRIEF DESCRIPTION OF THE DRAWINGS

Disclosed embodiments will be explained in greater detail below with reference to the figures, in which.

DETAILED DESCRIPTION

Autonomous driving, also referred to as automatic driving, automated driving, or piloted driving, is the movement of transportation vehicles, mobile robots and driverless transport systems that are largely autonomous. There are different degrees of autonomous driving. In Europe, various transport ministries, for example, the Federal Institute for Road Systems (Bundesanstalt für Straßenwesen) in Germany, have defined the following autonomous stages:

Level 0: "Driver only", the driver drives himself, steers, accelerates, brakes, etc.

Level 1: Certain assistance systems help with vehicle operation, including a cruise control system such as ACC (Automatic Cruise Control).

Level 2: Partial automation. Therein, automatic parking, tracking function, general longitudinal guidance, acceleration, deceleration, etc. are taken over by the assistance systems, including collision avoidance.

Level 3: High automation. The driver does not have to monitor the system continuously. The transportation vehicle independently performs functions such as the triggering of the turn signal, lane change and tracking. The driver can turn to other things, but if requested, the driver has to take over control within a pre-warning period.

Level 4: Full automation. The guidance of the transportation vehicle is permanently performed by the system. If the system is no longer able to handle the tasks, the driver can be asked to take over control.

Level 5: No driver required. Apart from setting the target and starting the system, no human intervention is required.

A slightly different definition of levels is known from the Society of Automotive Engineers (SAE). In this regard, reference is made to the SAE J3016 standard. Such definitions could also be used instead of the above given definition.

In the field of autonomous driving, it is known to make use of map data as well as data of vehicle sensors to control operation of a transportation vehicle. For example, US 2019/0092291 A1 discloses a method for operating a transportation vehicle relative to a passable object in a surrounding area of the transportation vehicle. In accordance with the method, map data values from a map are input. The map data values include first object data values representing the passable object. In addition, second object data values representing the surrounding area, including the passable object, are recorded. The input map data values are reconciled with the second object data values in accordance with predefined first comparison criteria. The transportation vehicle is then operated as a function of the reconciliation.

US 2019/0018408 A1 discloses a method for verifying the integrity of a sensing system. A transportation vehicle includes an integrated circuit configured to support a message-based protocol between the integrated circuit and a sensor device associated with the transportation vehicle, and send a sensor capability safety support message, as part of the message-based protocol, to determine one or more capabilities of the sensor device. The integrated circuit is also configured to receive, in response to the sensor capability safety support message, identification data corresponding to the sensor device, from the sensor device. The memory is configured to store a plurality of request data corresponding to a plurality of fields supported by the message-based protocol and associated with the integrated circuit and the sensor device capabilities, and store the response, including the identification data, from the sensor device.

One task that needs to be performed for autonomous driving is the recognition of the signalization or signal state of traffic lights. This recognition is at present realized using cameras. However, with the currently available camera systems, recognizing the signal state may not be sufficiently safe for a transportation vehicle that needs to autonomously enter an intersection with traffic lights.

In this regard, CN 106327897 A discloses a method for signaling a state of a traffic light on a display terminal of a transportation vehicle. The traffic light generates signal phase and timing information and transmits this information to a roadside unit. The roadside unit publishes intersection position information, local MAP information and real-time SPaT information. A transportation vehicle infrastructure communication module is used for information data interaction between a terminal device and the roadside unit. The terminal device is used for acquiring, processing and displaying vehicle motion state data and the state of the traffic light.

US 2020/004268 A1 document discloses a method for determining a validity of a message received by a first transportation vehicle in automated vehicle and highway systems. Status information of an intersection where a first transportation vehicle tries to enter and a Signal Phase and Timing (SPaT) message are received, a traveling route of the first transportation vehicle is set on a High-Definition (HD) map generated using the intersection status information, lane information having the same lane status as that of a travel lane of the first transportation vehicle is acquired based on the intersection status information and the SPaT message, and a first validity determination for determining whether the intersection status information and the SPaT message are valid is executed based on the lane information and the HD map.

It is to be expected that the recognition of the signal states of traffic lights will need to fulfill the requirements of ASIL (Automotive Safety Integrity Level).

These high safety requirements could mean that certain functions cannot be implemented in the transportation vehicle.

Disclosed embodiments provide improved solutions for controlling operation of a transportation vehicle equipped with an automated driving function.

This is achieved by a method, by a computer program which implements this method, and by an apparatus.

According to a first disclosed embodiment, a method for controlling operation of a transportation vehicle equipped with an automated driving function comprises:
  determining a first signal state of a traffic light from data of at least one transportation vehicle sensor and a second signal state of the traffic light from a SPaT message received from a communication infrastructure;
  validating the determined first signal state of the traffic light by comparing the first signal state and the second signal state; and
  setting an operation mode of the transportation vehicle as a function of a validation result, wherein the operation mode is set to a normal operation mode in case the first signal state and the second signal state match, to a safe mode in case the first signal state and the second signal state do not match, and to a fallback mode in case no first signal state can be determined.

Accordingly, a computer program comprises instructions, which, when executed by at least one processor, cause the at least one processor to perform the following operations for controlling operation of a transportation vehicle equipped with an automated driving function:
  determining a first signal state of a traffic light from data of at least one vehicle sensor and a second signal state of the traffic light from a SPaT message received from a communication infrastructure;
  validating the determined first signal state of the traffic light by comparing the first signal state and the second signal state; and
  setting an operation mode of the transportation vehicle as a function of a validation result, wherein the operation mode is set to a normal operation mode in case the first signal state and the second signal state match, to a safe mode in case the first signal state and the second signal state do not match, and to a fallback mode in case no first signal state can be determined.

The term computer has to be understood broadly. It also includes electronic control units, embedded devices and other processor-based data processing devices.

The computer program code can, for example, be made available for electronic retrieval or stored on a computer-readable storage medium.

According to another disclosed embodiment, an apparatus for controlling operation of a transportation vehicle equipped with an automated driving function comprises:
  an evaluation module configured to determine a first signal state of a traffic light from data of at least one vehicle sensor and a second signal state of the traffic light from a SPaT message received from a communication infrastructure;
  a validation module configured to validate the determined first signal state of the traffic light by comparing the first signal state and the second signal state; and
  a mode setting module configured to set an operation mode of the transportation vehicle as a function of a validation result, wherein the mode setting module is configured to set the operation mode to a normal operation mode in case the first signal state and the second signal state match, to a safe mode in case the first signal state and the second signal state do not match, and to a fallback mode in case no first signal state can be determined.

According to the disclosed embodiments, instead of trying to adapt the camera-based recognition of the signal state in such way that it fulfills the high safety requirements, the safety requirements are shifted to other components of the transportation vehicle. For this purpose, such components of the transportation vehicle are selected, which can easily fulfill high safety requirements. Information of these components is then used to validate the determined signal state.

According to the disclosed embodiments, a second signal state of the traffic light is determined from a SPaT message received from a communication infrastructure. The determined first signal state of the traffic light is then validated by comparing the first signal state and the second signal state. A SPaT message describes the current phase at a signalized intersection, together with the residual time of the phase, for every lane of the intersection. By using a redundant system for determining the signal state of the traffic light, the overall reliability of signal state recognition is increased. The operation mode is then set to a normal operation mode in case the first signal state and the second signal state match, to a safe mode in case the first signal state and the second signal state do not match, and to a fallback mode in case no first signal state can be determined. When both determined signal states match, this is a strong indication that the first signal state has been determined correctly and normal operation is possible. When both determined signal states conflict, this is a strong indication that the first signal state may not have been determined correctly. In this case, it is advisable to make use of a safe mode. In case no first signal state can be determined, the automated driving function needs to rely on the information of the SPaT message. In this case, it is advisable to enter a fallback mode, in which the transportation vehicle accesses further sensor information, e.g., information related to the behavior of the surrounding traffic. For example, the transportation vehicle may know that it is located on one of two straight-ahead lanes, but it is unsure if the traffic light shows green. If in this situation a transportation vehicle in the second/parallel lane enters the intersection, it could cross the intersection a little bit slower or with a slight delay. Another possibility is that if the transportation vehicle knows from map data that it is located at a traffic light which sends secured signals, e.g., SPaT and intersection geometry MAP messages, it may trust these signals and slowly pass the intersection, optionally in combination with a sensor detection of cross-traffic.

In an exemplary embodiment, the determined first signal state of the traffic light is further validated by determining if an ego-localization system of the transportation vehicle delivers results with a required accuracy, wherein the operation mode is set to a safe mode when this is not the case. Transportation vehicles with an automated driving function necessarily have an ego-localization system. Such a system will typically be able to perform a self-diagnosis, which can be used to evaluate the accuracy of the system. In case the results of the ego-localization are sufficiently accurate, it may be impossible to determine on which lane of a road with multiple lanes the transportation vehicle is located. As a consequence, the determined first signal state may actually refer to different lane and it is not safe to continue normal operation.

In an exemplary embodiment, the determined first signal state of the traffic light is further validated by determining if information obtained with environment sensors of the transportation vehicle is in agreement with information from a highly detailed map available in the transportation vehicle, wherein the operation mode is set to a safe mode when this is not the case. To facilitate the camera-based detection and evaluation of traffic lights, the positions of traffic lights can be included in a highly detailed map available in the transportation vehicle, as this allows reducing the search space of the camera. Current discussions place requirements on these map entries from a perspective of functional safety. In case there is a conflict between the information obtained with the environment sensors and the information from the highly detailed map, this is a strong indication that either the highly detailed map is not accurate or outdated or that the environment sensors deliver incorrect data. In both cases, it is not safe to continue normal operation.

In an exemplary embodiment, the determined first signal state of the traffic light is further validated by determining if information from a highly detailed map available in the transportation vehicle is in agreement with information from a MAP message received from a communication infrastructure, wherein the operation mode is set to a safe mode when this is not the case. A SPaT message is generally used together with a MAP message, which describes the physical geometry of one or more intersections. Generic facilities and infrastructure-centric messaging, such as SPaT and MAP messaging, are developed in ISO/TC 204/WG 18 jointly with CEN/TC 278/WG 16. In case there is a conflict between the information from the MAP message and the information from the highly detailed map, this is an indication that the highly detailed map is not accurate or outdated. As a consequence, it is not safe to rely on the highly detailed map for detecting and evaluating traffic lights and to continue normal operation.

In an exemplary embodiment, the determined first signal state of the traffic light is further validated by determining if information from a SPaT message received from a communication infrastructure is in agreement with information from a MAP message received from the communication infrastructure, wherein the operation mode is set to a safe mode when this is not the case. In case there is a conflict between the information from the SPaT message and the information from the MAP message, this is a strong indication that at least one of those messages is not correct. As a consequence, it is not safe to rely on the information from the SPaT message to determine the signal state and to continue normal operation.

In an exemplary embodiment, in the safe mode the transportation vehicle is brought into a safe condition. For example, the transportation vehicle may be securely stopped. This ensures that the transportation vehicle does not perform any action that may cause harm to the surrounding traffic.

A transportation vehicle equipped with an automated driving function comprises an exemplary apparatus or is configured to perform a disclosed method for controlling operation of the transportation vehicle. In this way, the transportation vehicle is able to fulfill the high safety requirements of the recognition of the signal states of traffic lights. The transportation vehicle may be any type of vehicle, e.g., a car, a bus, a motorcycle, a commercial vehicle, in particular, a truck, an agricultural machinery, a construction machinery, a rail vehicle, etc. More generally, the disclosed embodiments can be used in all transportation vehicles that need to cope with traffic lights.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a method or mechanism for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited methods and mechanisms are combined and brought together in the way which the claims call for. It is thus regarded that any method or mechanism that can provide those functionalities are equivalent to those shown herein.

Figure 1:
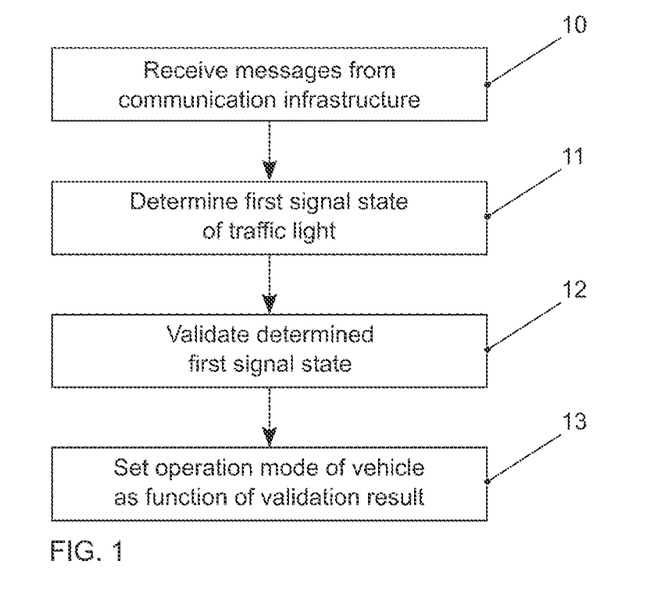
FIG. 1 schematically illustrates a method for controlling operation of a transportation vehicle equipped with an automated driving function.

FIG. 1 schematically illustrates a disclosed method for controlling operation of a transportation vehicle equipped with an automated driving function. As shown in FIG. 1, the method begins with receipt 10 of messages from a communication infrastructure. Thereafter, a first signal state of a traffic light is determined 11 from data of at least one transportation vehicle sensor. The determined first signal state of the traffic light is then validated 12 based on information available in the transportation vehicle. For this purpose, a second signal state may be determined from a SPaT message received from a communication infrastructure. The first signal state may then be validated by comparing the first signal state and the second signal state. Furthermore, the first signal state may be validated by determining if an ego-localization system of the transportation vehicle delivers results with a required accuracy, by determining if information obtained with environment sensors of the transportation vehicle is in agreement with information from a highly detailed map available in the transportation vehicle, by determining if information from the highly detailed map is in agreement with information from a MAP message received from the communication infrastructure, or by determining if information from the SPaT message is in agreement with information from the MAP message. Of course, also combinations of these validation measures may be used. Finally, an operation mode of the transportation vehicle is set 13 as a function of a validation result. Optionally, the operation mode may be set to a safe mode in case any of the validation measures delivers a negative result. In the safe mode, the transportation vehicle may be brought into a safe condition. If all validation measures deliver a positive result, the operation mode may be set to a normal operation mode. In case no second signal state may be determined from the data of the at least one transportation vehicle sensor, the operation mode may be set to a fallback mode, in which the transportation vehicle accesses further sensor information or trusts the determined second signal state.

Figure 2:
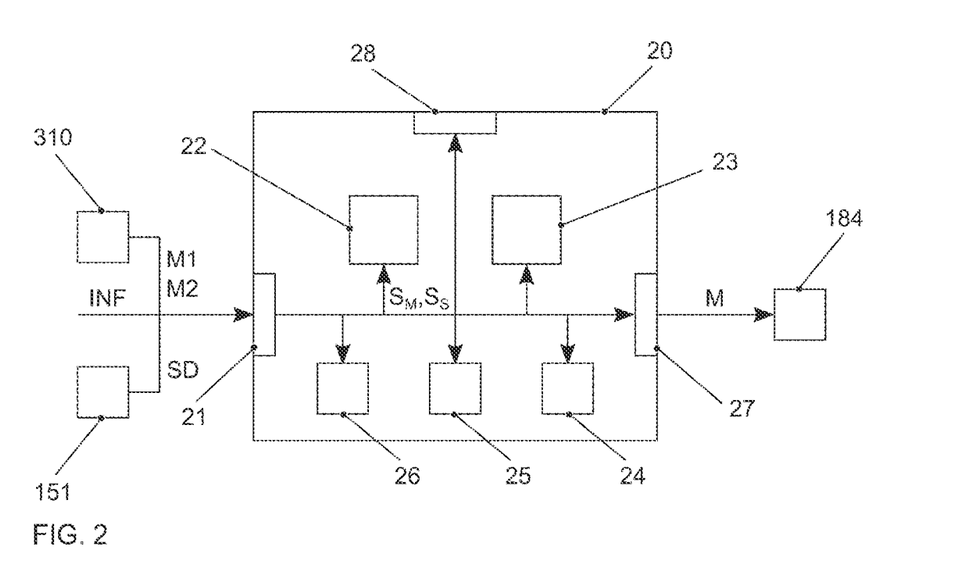
FIG. 2 schematically illustrates a first exemplary embodiment of an apparatus for controlling operation of a transportation vehicle equipped with an automated driving function.

FIG. 2 schematically illustrates a block diagram of a first disclosed embodiment of an exemplary apparatus 20 for controlling operation of a transportation vehicle equipped with an automated driving function. The apparatus 20 has an input 21 for receiving data, e.g., messages M1, M2 from a communication infrastructure 310, sensor data SD of at least one vehicle sensor 151 or further information INF available in the transportation vehicle. An evaluation module 22 is configured to determine a first signal state $S_S$ of a traffic light from the sensor data SD. In addition, the evaluation module 22 may determine a second signal state $S_M$ from a SPaT message received from the communication infrastructure 310. A validation module 23 is configured to validate the determined first signal state $S_S$ of the traffic light based on the information INF available in the transportation vehicle. For example, the validation module 23 may validate the first signal state $S_S$ by comparing the first signal state $S_S$ and the second signal state $S_M$, by determining if an ego-localization system of the transportation vehicle delivers results with a required accuracy, by determining if information obtained with environment sensors of the transportation vehicle is in agreement with information from a highly detailed map available in the transportation vehicle, by determining if information from the highly detailed map is in agreement with information from a MAP message received from the communication infrastructure, or by determining if information from the SPaT message is in agreement with information from the MAP message. Of course, also combinations of these validation measures may be used. A mode setting module 24 is configured to set an operation mode of the transportation vehicle as a function of a validation result. Optionally, the mode setting module 24 may set the operation mode to a safe mode in case any of the validation measures delivers a negative result. In the safe mode, the transportation vehicle may be brought into a safe condition. If all validation measures deliver a positive result, the mode setting module 24 may set the operation mode to a normal operation mode. In case no second signal state SS may be determined from the sensor data SD, the operation mode may be set to a fallback mode, in which the transportation vehicle accesses further sensor information or trusts the determined second signal state. For setting the operation mode, the mode setting module 24 may generate a mode signal M, which may be provided to an automatic driving control unit 184 via an output 27. A local storage unit 26 is provided, e.g., for storing data during processing. The output 27 may also be combined with the input 21 into a single bidirectional interface.

The evaluation module 22, the validation module 23, and the mode setting module 24 may be controlled by a controller 25. A user interface 28 may be provided for enabling a user to modify settings of the evaluation module 22, the validation module 23, the mode setting module 24, or the controller 25. The evaluation module 22, the validation module 23, the mode setting module 24, and the controller 25 can be embodied as dedicated hardware units. Of course, they may likewise be fully or partially combined into a single unit or implemented as software running on a processor, e.g., a CPU or a GPU.

Figure 3:
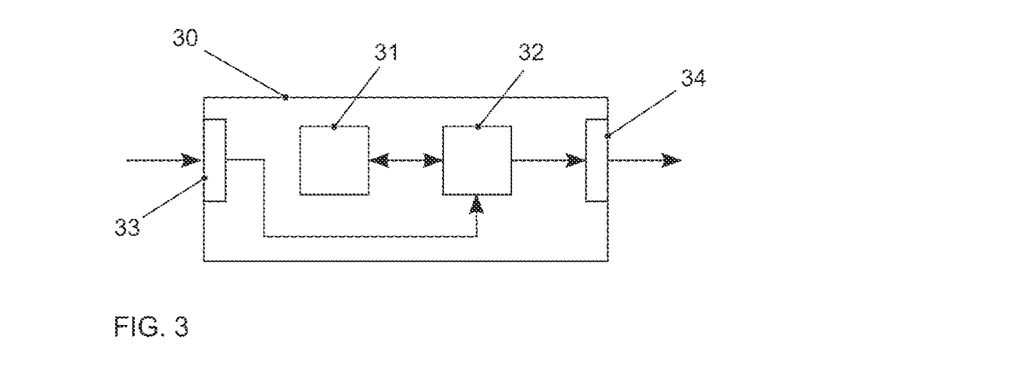
FIG. 3 schematically illustrates a second exemplary embodiment of an apparatus for controlling operation of a transportation vehicle equipped with an automated driving function.

A block diagram of a second disclosed embodiment of an exemplary apparatus 30 for controlling operation of a transportation vehicle equipped with an automated driving function is illustrated in FIG. 3. The apparatus 30 comprises a processing device 31 and a memory device 32. For example, the apparatus 30 may be a computer, an electronic control unit or an embedded system. The memory device 32 has stored instructions that, when executed by the processing device 31, cause the apparatus 30 to perform operations according to one of the described methods. The instructions stored in the memory device 32 thus tangibly embody a program of instructions executable by the processing device 31 to perform program operation as described herein according to the present principles. The apparatus 30 has an input 33 for receiving data. Data generated by the processing device 31 are made available via an output 34. In addition, such data may be stored in the memory device 32. The input 33 and the output 34 may be combined into a single bidirectional interface.

The processing device 31 as used herein may include one or more processing units, such as microprocessors, digital signal processors, or a combination thereof.

The local storage unit 26 and the memory device 32 may include volatile and/or non-volatile memory regions and storage devices such as hard disk drives, optical drives, and/or solid-state memories.

In the following, a disclosed embodiment shall be explained in more detail with reference to FIG. 4 to FIG. 7.

Figure 4:
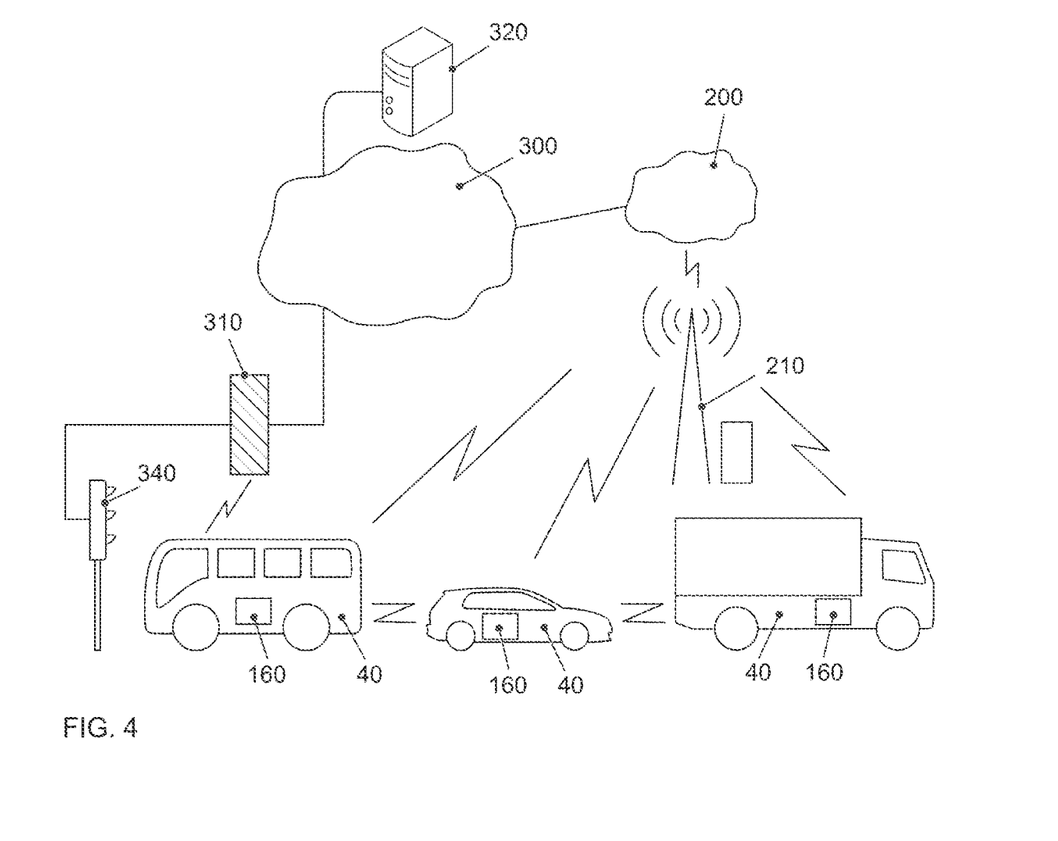
FIG. 4 illustrates a basic architecture of a V2V and V2X communication system.

FIG. 4 illustrates a basic architecture of a V2V (Vehicle-to-Vehicle) and V2X (Vehicle-to-Everything) communication system. Reference numeral 40 denotes transportation vehicles, which in this example are a shuttle bus, a car, and a truck. The transportation vehicles 40 are equipped with an on-board connectivity module 160 including a corresponding antenna such that the transportation vehicles 40 can participate in any form of wireless communication service. As shown in FIG. 4, the transportation vehicles 40 may transmit and receive signals to and from a roadside unit 310 or a base station 210 of a mobile communication service provider. The roadside unit 310 and the base station 210 may be connected to a control center computer 320 via a network 300, 200. Also shown is a traffic light 340 connected to the roadside unit 310. The roadside unit 310 may transmit SPaT and MAP messages related to the traffic light 340 to the transportation vehicles 40 via broadcast/direct communication.

The transportation vehicles 40 may also be equipped with methods or mechanisms for observing their surroundings. Their sensor systems, which are used to capture the environmental objects, are based on different measuring methods, depending on the application. Widespread technologies are, among others, RADAR, LIDAR, cameras for 2D and 3D image acquisition, and ultrasonic sensors.

Since automated driving is on the rise, a lot more data needs to be exchanged among the transportation vehicles 40, e.g., using V2V communication, and also between the transportation vehicles 40 and the network. The communication systems for V2V and V2X communication need to be adapted correspondingly. They may make use of mobile communication technologies, such as LTE or 5G, wireless local area networks, or even optical communication technologies.

Figure 5:
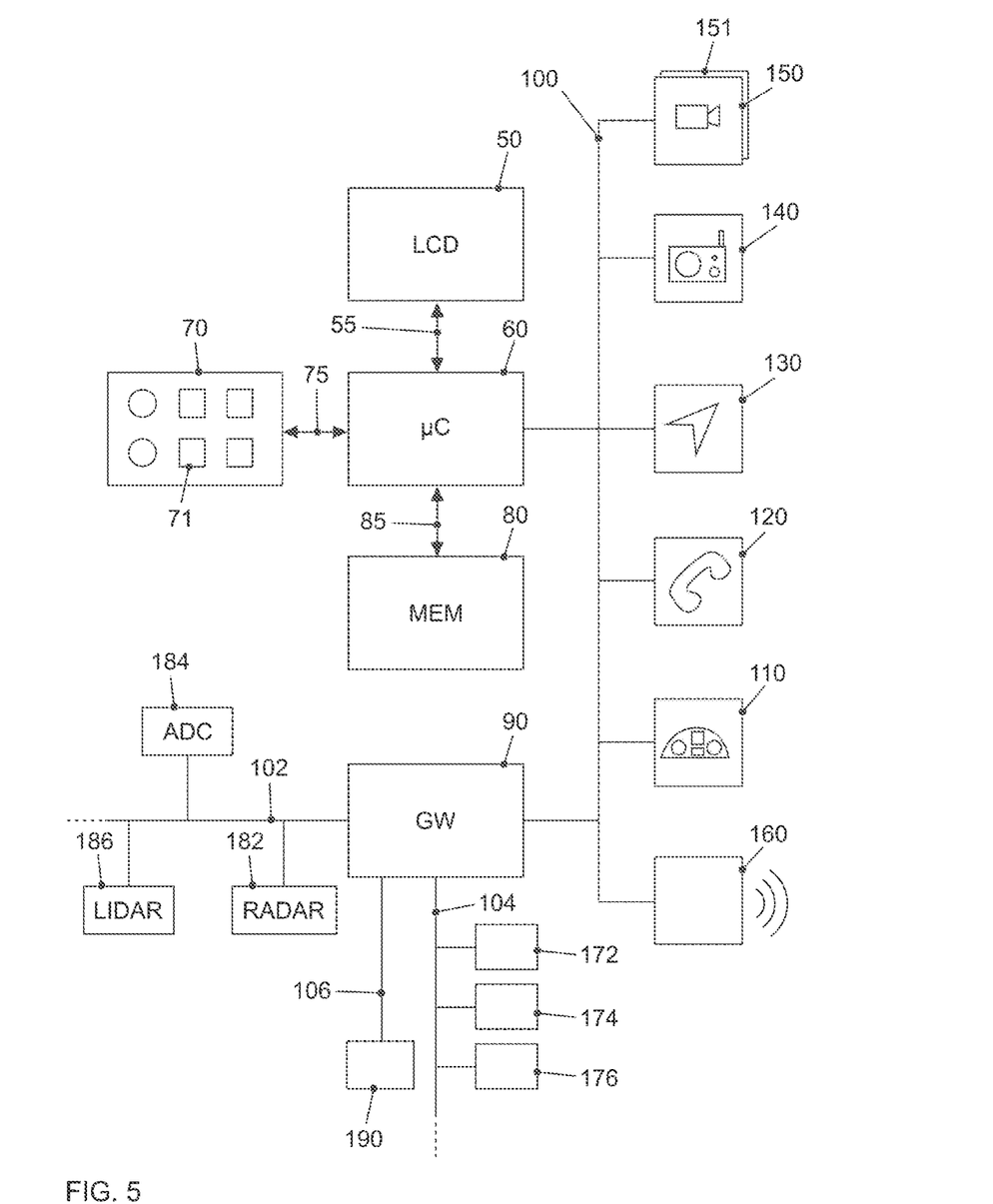
FIG. 5 shows a block diagram of an electronics system of a transportation vehicle.

FIG. 5 schematically shows an exemplary block diagram of a board electronics system of a transportation vehicle. Part of the board electronics system is an infotainment system, which comprises a touch-sensitive display unit 50, a computing device 60, an input unit 70, and a memory device 80. The display unit 50 is connected to the computing device 60 via a data line 55 and includes both a display area for displaying variable graphical information and an operator interface (touch-sensitive layer) arranged above the display area for inputting commands by a user. The input unit 70 is connected to the computing device 60 via a data line 75. Reference numeral 71 designates a press button that allows a driver to manually request a tele-operated driving session if the transportation vehicle is blocked and the driver wants the support of a tele-operated driving operator to find a way out of the blocking situation. There is no need for a dedicated press button 71 if other techniques for manual control are used. This includes selecting an option in a user menu displayed on the display unit 50, detecting the command with speech recognition, or using gesture control methods or mechanisms.

The memory device 80 is connected to the computing device 60 via a data line 85. In the memory device 80, a pictogram directory and/or symbol directory is deposited with pictograms and/or symbols for possible overlays of additional information.

The other parts of the infotainment system, such as a camera 150, radio 140, navigation device 130, telephone 120 and instrument cluster 110 are connected via a data bus 100 with the computing device 60. As data bus 100, the high-speed option of the CAN (Controller Area Network) bus according to ISO standard 11898-2 may be used. Alternatively, an Ethernet-based bus system such as IEEE 802.03cg can be used. Bus systems implementing the data transmission via optical fibers are also usable. Examples are the MOST Bus (Media Oriented System Transport) or the D2B Bus (Domestic Digital Bus). For inbound and outbound wireless communication, the transportation vehicle is equipped with an on-board connectivity module 160. It can be used for mobile communication, e.g., mobile communication according to the 5G standard.

Reference numeral 172 denotes an engine control unit. Reference numeral 174 denotes an ESC (electronic stability control) unit, whereas reference numeral 176 denotes a transmission control unit. The networking of such control units, all of which are allocated to the category of the drive train, typically occurs with a CAN bus 104. Since various sensors are installed in the transportation vehicle and these are no longer only connected to individual control units, such sensor data are also distributed via the bus system 104 to the individual control devices.

Modern transportation vehicles may comprise additional components, such as further sensors for scanning the surroundings, like a LIDAR sensor 186 or a RADAR sensor 182 and additional video cameras 151, e.g., a front camera, a rear camera or side cameras. Such sensors are increasingly used in transportation vehicles for observation of the environment. Further control devices, such as an ADC (automatic driving control) unit 184, etc., may be provided in the transportation vehicle. The RADAR and LIDAR sensors 182, 186 may have a scanning range of up to 250 m, whereas the cameras 150, 151 may cover a range from 30 m to 120 m. The components 182 to 186 are connected to another communication bus 102, e.g., an Ethernet-Bus due to its higher bandwidth for data transport. One Ethernet-bus adapted to the special needs of car communication is standardized in the IEEE 802.1Q specification. Moreover, a lot of information about the environment may be received via V2V communication from other transportation vehicles. Particularly for those transportation vehicles that are not in line of sight to the observing transportation vehicle, it is very beneficial to receive the information about their position and motion via V2V communication.

Reference numeral 190 denotes an on-board diagnosis interface, which is connected to another communication bus 106.

For the purpose of transmitting the transportation vehicle-relevant sensor data via the an on-board connectivity module 160 to another transportation vehicle, to other infrastructure, or to a control center computer, a gateway 90 is provided. This gateway 90 is connected to the different bus systems 100, 102, 104 and 106. The gateway 90 is adapted to convert the data it receives via one bus to the transmission format of another bus so that it can be distributed using the packets specified for the respective other bus. For forwarding this data to the outside, i.e., to another transportation vehicle or to the control central computer, the an on-board connectivity module 160 is equipped with a communication interface to receive these data packets and, in turn, to convert them into the transmission format of the appropriate mobile radio standard.

Figure 6:
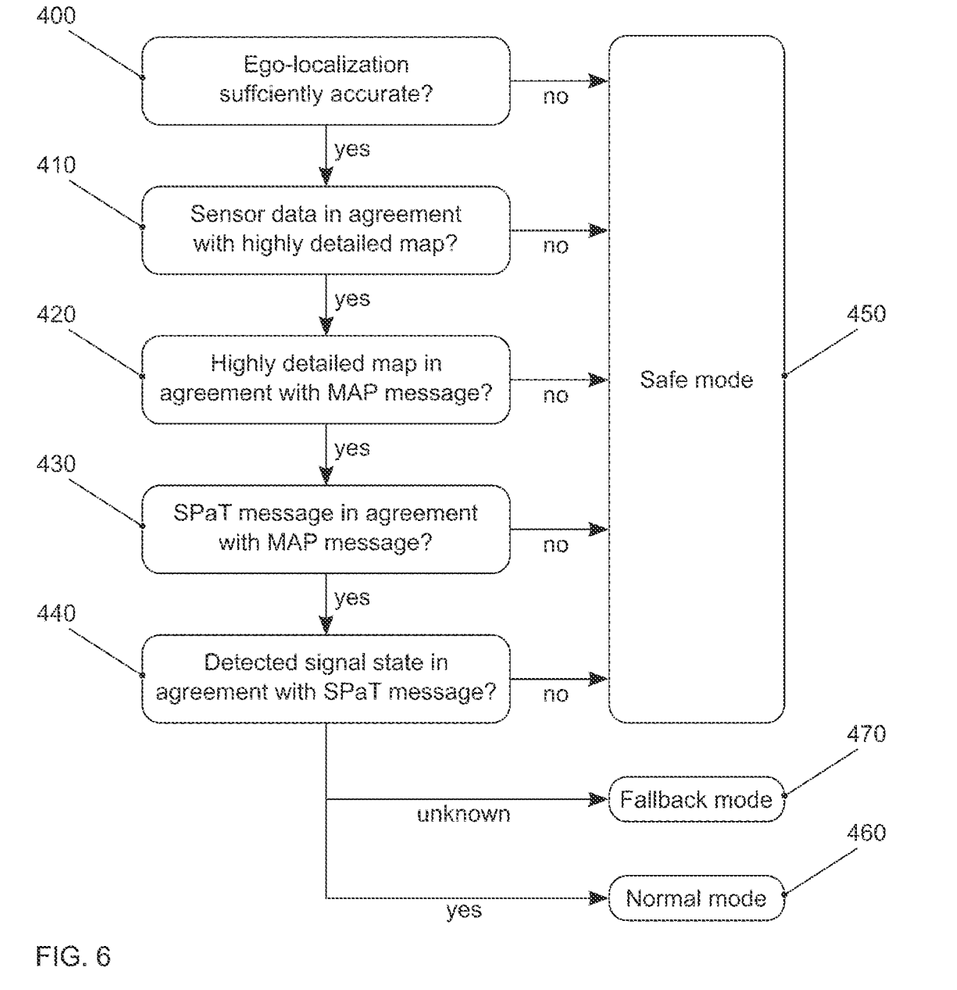
FIG. 6 shows an exemplary embodiment of a method for controlling operation of a transportation vehicle equipped with an automated driving function.

FIG. 6 shows a disclosed embodiment of a method for controlling operation of a transportation vehicle equipped with an automated driving function. According to this exemplary embodiment, several verification operations are performed. Depending on the respective verification results, either a decision is made to set the operation mode to normal operation or a decision is made to set the operation mode to a safe mode.

In a first verification operation at 400, the ego-localization of the transportation vehicle is evaluated. It is checked if an ego-localization system of the transportation vehicle delivers results with a required accuracy, e.g., sufficiently accurate to locate the transportation vehicle on one of several lanes. If this is not the case, the operation mode is set to safe mode 450, in which the transportation vehicle is brought into a safe condition, e.g., securely stopped. Otherwise, the method proceeds to the second verification operation at 410. In the second verification operation at 410, it is checked whether information obtained with environment sensors of the transportation vehicle is in agreement with information from a highly detailed map available in the transportation vehicle. If this is not the case, the operation mode is set to safe mode 450. Otherwise, the method proceeds to the third verification operation at 420. In the third verification operation at 420, the information from the highly detailed map is compared with information retrieved from a MAP message. It is checked whether the information from the highly detailed map is in agreement with the information from the MAP message, e.g., with regard to the number and direction of the lanes. If this is not the case, the operation mode is set to safe mode 450. Otherwise, the method proceeds to the fourth verification operation at 430. In the fourth verification operation at 430, it is checked whether information retrieved from a SPaT message is in agreement with the information from the MAP message. If this is not the case, the operation mode is set to safe mode 450. Otherwise, the method proceeds to the fifth verification operation at 440. In the fifth verification operation at 440, it is checked whether the signal state of the traffic light detected with the transportation vehicle sensors is in agreement with the information from the SPaT message. If the signal states do not match, the operation mode is set to safe mode 450. If the signal states match, the operation mode is set to a normal operation mode 460 and the transportation vehicle will continue its course once this is permitted by the traffic light. It may happen that no signal state can be detected with the vehicle sensors. For this situation, a fallback operation mode 470 may be defined, in which the transportation vehicle accesses further sensor information or trusts the determined second signal state.

Figure 7:
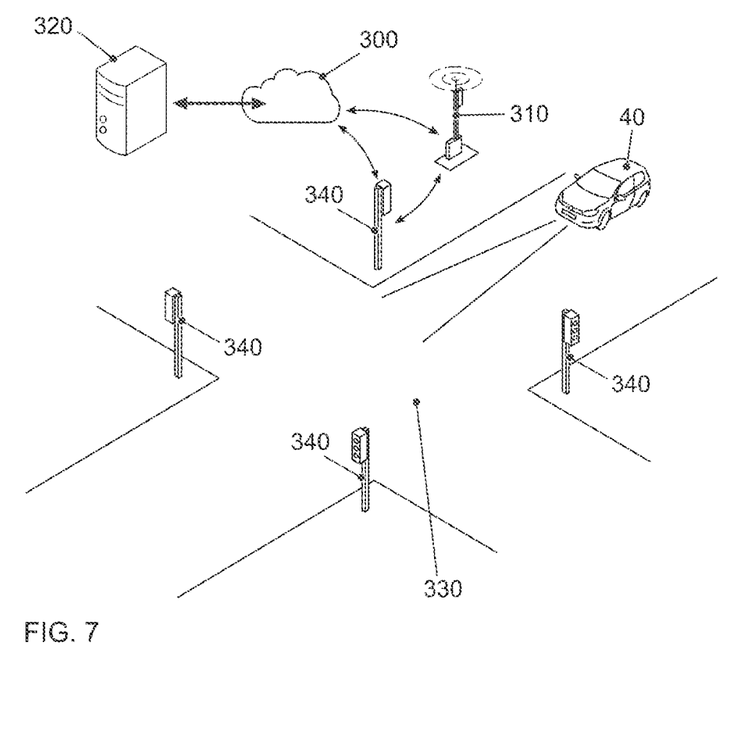
FIG. 7 shows a transportation vehicle approaching a signalized intersection.

FIG. 7 shows a transportation vehicle 40 approaching a signalized intersection 330. Traffic is regulated using several traffic lights 340. A roadside unit 310, which may be connected to a control center computer 320 via a network 300, is provided for transmitting infrastructure related data to transportation vehicles 40 in the vicinity of the intersection 330. The roadside unit 310 may likewise be connected to the traffic lights 340 without a connection to a control center computer 320. In this case, the roadside unit 310 receives the relevant information directly from a controller of the traffic lights 340 and transmits it to the transportation vehicle 40 via broadcast/direct communication, e.g., as SPaT and MAP messages. The transportation vehicle 40 is equipped with an automated driving function, e.g., of level 4 or 5. The automated driving function needs to respect all the traffic regulations, including traffic signs and traffic lights, etc. Instead of just relying on the data of the vehicle camera for determining the signal state of the relevant traffic light 340, the automated driving function additionally evaluates the SPaT and MAP messages provided by the roadside unit 310 as well as data of a highly detailed map and sensor data provided by further transportation vehicle sensors, as described above with reference to FIG. 6.

REFERENCE NUMERALS

10 Receive messages from communication infrastructure
11 Determine signal state of traffic light
12 Validate determined signal state
13 Set operation mode as function of validation result
20 Apparatus
21 Input
22 Evaluation module
23 Validation module
24 Mode setting module
25 Controller
26 Local storage unit
27 Output
28 User interface
30 Apparatus
31 Processing device
32 Memory device
33 Input
34 Output
40 Transportation vehicle
50 Display Unit
55 Data line to display unit
60 Computing device
70 Input unit
71 Press button
75 Data line to input unit
80 Memory unit
85 Data line to memory unit
90 Gateway
100 First data bus
102 Second data bus
104 Third data bus
106 Fourth data bus
110 Instrument cluster
120 Telephone
130 Navigation device
140 Radio
150 Camera
151 Further cameras
160 On-board connectivity module
172 Engine control unit
174 Electronic stability control unit
176 Transmission control unit
182 RADAR sensor
184 Automatic driving control unit
186 LID AR sensor
190 On-board diagnosis interface
210 Base station
300 Network
310 Roadside unit
320 Control center computer
330 Intersection
340 Traffic light
400 First verification operation
410 Second verification operation
420 Third verification operation
430 Fourth verification operation
440 Fifth verification operation
450 Safe mode
460 Normal operation
470 Fallback operation INF Information
M Mode signal
M1, M2 Message
SD Sensor data
$S_M$, $S_S$ Signal state

The invention claimed is:

1. An apparatus for controlling operation of a transportation vehicle equipped with an automated driving function, the apparatus comprising:
   an evaluation module configured to determine a first signal state of a traffic light from data generated by at least one transportation vehicle sensor and to determine a second signal state of the traffic light from a Signal Phase and Timing (SPaT) message received from a communication infrastructure;
   a validation module configured to generate a validation result that validates whether the determined first signal state of the traffic light generated by the at least one transportation vehicle sensor is valid by comparing the determined first signal state and the determined second signal state; and
   a mode setting module configured to set an operation mode of the transportation vehicle as a function of the validation result, wherein the mode setting module sets the operation mode to:
      a normal operation mode in response to the validation result indicating that the determined first signal state generated by the at least one transportation vehicle sensor is valid because the determined first signal state matches the determined second signal state,
      a safe mode in response to the validation result indicating that the determined first signal state generated by the at least one transportation vehicle sensor is not valid because the determined first signal state does not match the determined second signal state, and
      a fallback mode in response to no first signal state being generated by the at least one transportation vehicle sensor thereby resulting in no validation result being determined to control setting performed by the mode setting module.

2. The apparatus of claim 1, wherein, in the fallback mode, the transportation vehicle accesses further sensor information or trusts the determined second signal state as part of the controlling of the operation the automated driving function of the transportation vehicle.

3. The apparatus of claim 2, wherein the further sensor information indicates surrounding traffic behavior.

4. The apparatus of claim 2, wherein, in the fallback mode, the transportation vehicle trusts the determined second signal state in response to the transportation vehicle determining, based on map data, that the traffic light at which the transportation vehicle is located is a traffic light which sends secured signals.

5. The apparatus of claim 1, wherein the determined first signal state of the traffic light generated by the at least one transportation vehicle sensor is further validated by determining whether an ego-localization system of the transportation vehicle is delivering results with a required accuracy, wherein the operation mode is set to the safe mode in response to a determination that the ego-localization system of the transportation vehicle is not delivering results with the required accuracy.

6. The apparatus of claim 1, wherein the transportation vehicle determines whether information obtained with environment sensors of the transportation vehicle is in agreement with information from a map available in the transportation vehicle, wherein the operation mode is set to the safe mode in response to the information obtained by the environment sensors not being in agreement with the information from the map available in the transportation vehicle.

7. The apparatus of claim 1, wherein the transportation vehicle determines whether information from a map available in the transportation vehicle is in agreement with information from an intersection geometry (MAP) message received from the communication infrastructure, wherein the operation mode is also set to the safe mode in response to the information from the map available in the transportation vehicle not being in agreement with the information from the MAP message received from the communication infrastructure.

8. The apparatus of claim 1, wherein the transportation vehicle determines whether information from the SPaT message received from the communication infrastructure is in agreement with information from an intersection geometry (MAP) message received from the communication infrastructure, wherein the operation mode is also set to the safe mode in response to the information from the SPaT message received from the communication infrastructure not being in agreement with information from the MAP message received from the communication infrastructure.

9. The apparatus of claim 1, wherein, in the safe mode, the transportation vehicle is brought into a safe condition.

10. A transportation vehicle equipped with an automated driving function, wherein the transportation vehicle comprises:
   at least one transportation vehicle sensor;
   a communication infrastructure; and
   an apparatus for controlling operation of the transportation vehicle,
   wherein the apparatus includes an evaluation module configured to determine a first signal state of a traffic light from data generated by the at least one transportation vehicle sensor and to determine a second signal state of the traffic light from a signal phase and timing (SPaT) message received via the communication infrastructure, a validation module configured to generate a validation result that validates the determined first signal state of the traffic light generated by the at least one transportation vehicle sensor by comparing the determined first signal state and the determined second signal state, and a mode setting module configured to set an operation mode of the transportation vehicle as a function of the validation result, wherein the mode setting module sets the operation mode to:
      a normal operation mode in response to the validation result indicating that the determined first signal state generated by the at least one transportation vehicle sensor is valid because the determined first signal state matches the determined second signal state,
      a safe mode in response to the validation result indicating that the determined first signal state generated by the at least one transportation vehicle sensor is not valid because the determined first signal state does not match the determined second signal state, and
      a fallback mode in response to no first signal state being generated by the at least one transportation vehicle sensor thereby resulting in no validation result being determined to control setting performed by the mode setting module.

11. A method for controlling operation of a transportation vehicle equipped with an automated driving function, the method comprising:
   determining a first signal state of a traffic light from data generated by at least one transportation vehicle sensor and determining a second signal state of the traffic light from a Signal Phase and Timing (SPaT) message received from a communication infrastructure;

generating a validation result that validates the determined first signal state of the traffic light generated by the at least one transportation vehicle sensor by comparing the determined first signal state and the determined second signal state; and setting an operation mode of the transportation vehicle as a function of the validation result, wherein the operation mode is set to:
- a normal operation mode in response to the validation result indicating that the determined first signal state is valid because the generated first state matches the determined second signal state,
- a safe mode in response to the validation result indicating that the determined first signal state generated by the at least one transportation vehicle sensor is not valid because the determined first signal state does not match the determined second signal state, and
- a fallback mode in response to no first signal state being generated by the at least one transportation vehicle sensor thereby resulting in no validation result being determined.

12. The method of claim 11, further comprising the transportation vehicle accessing further sensor information or trusting the determined second signal state, in the fallback mode, as part of the controlling of the operation of the automated driving function of the transportation vehicle.

13. The method of claim 12, wherein the further sensor information indicates surround traffic behavior.

14. The method of claim 12, wherein, in the fallback mode, the transportation vehicle trusts the determined second signal state in response to the transportation vehicle determining, based on accessing map data, that the traffic light at which the transportation vehicle is located is a traffic light which sends secured signals.

15. The method of claim 11, wherein the determined first signal state of the traffic light generated by the at least one transportation vehicle sensor is further validated by determining whether an ego-localization system of the transportation vehicle is delivering results with a required accuracy, wherein the operation mode is set to the safe mode in response to a determination that the ego-localization system of the transportation vehicle is not delivering results with the required accuracy.

16. The method of claim 11, further comprising determining whether information obtained with environment sensors of the transportation vehicle is in agreement with information from a map available in the transportation vehicle, wherein the operation mode is also set to the safe mode in response to the information obtained with the environment sensors not being in agreement with the information from the map available in the transportation vehicle.

17. The method of claim 11, further comprising determining whether information from a map available in the transportation vehicle is in agreement with information from an intersection geometry (MAP) message received from the communication infrastructure, wherein the operation mode is also set to the safe mode in response to the information from the map available in the transportation vehicle not being in agreement with the information from the MAP message received from the communication infrastructure.

18. The method of claim 11, further comprising determining whether information from the SPaT message received from the communication infrastructure is in agreement with information from an intersection geometry (MAP) message received from the communication infrastructure, wherein the operation mode is also set to the safe mode in response to the information from the SPaT message received from the communication infrastructure not being in agreement with information from the MAP message received from the communication infrastructure.

19. The method of claim 11, wherein, in the safe mode, the transportation vehicle is brought into a safe condition.

20. A non-transitory computer readable medium including a computer program comprising instructions, which execute the method of claim 11 for controlling operation of a transportation vehicle.

* * * * *